United States Patent
Rockey et al.

(10) Patent No.: US 11,572,969 B2
(45) Date of Patent: Feb. 7, 2023

(54) CONNECTION ARRANGEMENT FOR A FLUID TRANSFER INTERFACE

(71) Applicant: Cummins Inc., Columbus, IN (US)

(72) Inventors: Shawn A. Rockey, Seymour, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 75 days.

(21) Appl. No.: 16/711,804

(22) Filed: Dec. 12, 2019

(65) Prior Publication Data

US 2021/0180734 A1 Jun. 17, 2021

(51) Int. Cl.
*F16L 33/18* (2006.01)
*F16L 33/035* (2006.01)
*F16L 19/02* (2006.01)
*F16J 15/02* (2006.01)

(52) U.S. Cl.
CPC ............ *F16L 33/18* (2013.01); *F16J 15/025* (2013.01); *F16L 19/0212* (2013.01); *F16L 33/035* (2013.01)

(58) Field of Classification Search
CPC ....... F16L 33/18; F16L 33/223; F16L 33/035; F16L 19/0212; F16L 19/0218; F16L 47/04; F16J 15/022; F16J 15/025; Y10S 285/91; Y10S 285/918
See application file for complete search history.

(56) References Cited

U.S. PATENT DOCUMENTS

| | | | |
|---|---|---|---|
| 3,591,205 A | 7/1971 | Hamburg | |
| 4,627,644 A * | 12/1986 | Ekman | F16L 33/227 285/24 |
| 4,709,726 A | 12/1987 | Fitzgibbons | |
| 5,110,158 A | 5/1992 | Sabo | |
| 5,364,135 A * | 11/1994 | Anderson | F16L 19/0212 277/622 |
| 8,662,909 B2 | 3/2014 | Franke | |
| 2008/0231041 A1* | 9/2008 | Bucchi | F16L 33/224 |
| 2008/0277879 A1* | 11/2008 | Pradelle | F16J 15/025 |
| 2010/0018693 A1 | 1/2010 | Duncan et al. | |
| 2010/0181727 A1* | 7/2010 | Santi | |

(Continued)

FOREIGN PATENT DOCUMENTS

| | | |
|---|---|---|
| CN | 1108980496 A | 12/2018 |
| EP | 2455645 | 11/2010 |

(Continued)

OTHER PUBLICATIONS

Chinese Office Action from CN Serial No. 201780024650.1, 9 pgs, dated Jan. 21, 2020.

(Continued)

*Primary Examiner* — Zachary T Dragicevich
(74) *Attorney, Agent, or Firm* — Taft, Stettinius & Hollister LLP

(57) ABSTRACT

A fluid transfer connector securely connects a port fitting of a fluid device to a fluid hose. The fluid transfer connector includes an attachment member attachable to the port fitting of the fluid storage device. The fluid transfer connector further includes a hose adapter including a housing with a seal that wipes and sealingly engages the port fitting when the hose adapter is engaged to the attachment member.

14 Claims, 2 Drawing Sheets

(56) References Cited

U.S. PATENT DOCUMENTS

| | | |
|---|---|---|
| 2013/0306665 A1 | 11/2013 | Eberhardt et al. |
| 2014/0138568 A1 | 5/2014 | van Vurren et al. |
| 2014/0290214 A1 | 10/2014 | Heichelbech et al. |
| 2014/0319825 A1 | 10/2014 | Jones et al. |
| 2018/0347731 A1 | 12/2018 | Kesler et al. |
| 2019/0024559 A1 | 1/2019 | Rockey |

FOREIGN PATENT DOCUMENTS

| | | |
|---|---|---|
| GB | 17810 | 1/1913 |
| WO | WO2009095477 | 8/2009 |

OTHER PUBLICATIONS

Chinese Office Action from Counter Chinese Application, CN Serial No. 201780024650.1, dated Apr. 16, 2021, 8 pgs.

Office Action, Counter CN Application No. 202011465512.7, 10 pgs., dated Jun. 17, 2022.

\* cited by examiner

CONNECTION ARRANGEMENT FOR A FLUID TRANSFER INTERFACE

TECHNICAL FIELD

The present disclosure relates generally to fluid connectors, and more particularly but not exclusively to a connection arrangement for a fluid transfer interface.

BACKGROUND

Fluid transfer interfaces, such as for connecting a fluid flow line to a fluid tank, pump, or other device, typically involve a connector for completing the interface. Current connectors suffer from various drawbacks and deficiencies. Therefore, there remains a need for further improvements in connectors for fluid transfer interfaces.

SUMMARY

A fluid transfer connector for securely connecting a port fitting of a fluid device (e.g., a tank, a pump or a doser) to a fluid hose is provided. In one embodiment, the fluid transfer connector comprises an attachment member attachable to a port fitting of the fluid device. The fluid transfer connector further comprises a hose adapter for connection between the fluid hose and the attachment member. The hose adapter includes a housing that is engaged to the attachment member to clamp the fluid transfer member to a stop on the port fitting. The housing also includes an inner seal for wiping and sealingly engaging the port fitting, and a hose interface member for engagement with the fluid hose.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
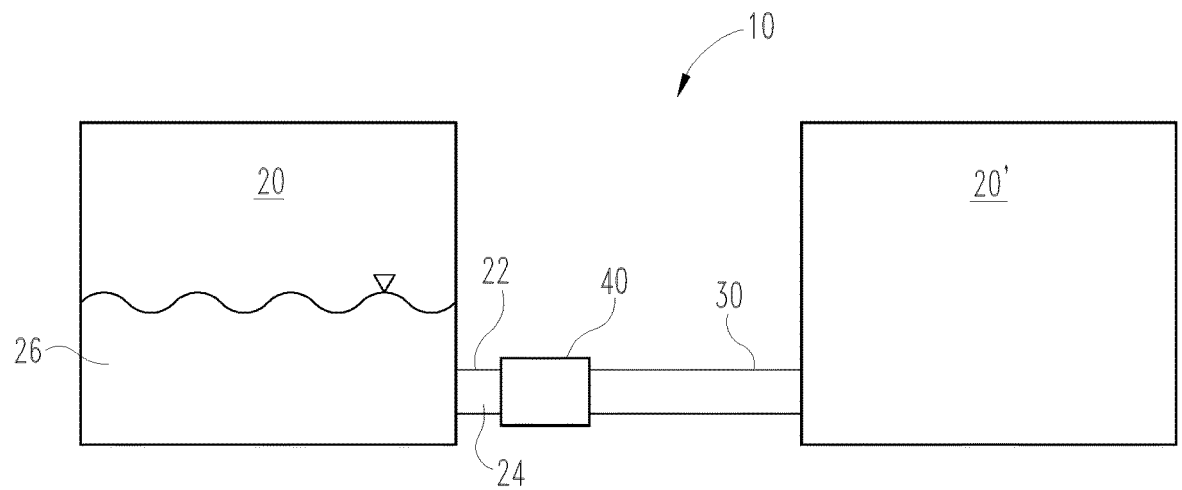
FIG. 1 is a block diagram of a fluid transfer circuit using one or more fluid transfer connectors according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a block diagram of a fluid transfer circuit 10 for connecting a fluid device 20 to a hose 30 is shown. The fluid device 20 may be, for example, a tank, a pump, a doser, or any other device that includes a port fitting 22 that is an inlet or outlet to the fluid device 20. A fluid transfer connector 40 connects the hose 30 to the port fitting 22 of the fluid device 20. The fluid transfer connector 40 can be used for any type of fluid 28, including coolants, refrigerants, oils, fuels, diesel exhaust fluid, and/or vapors. In practice, fluid transfer connector 40 must be compatible with the fluid 26, provide a robust seal of the port fittings, and be capable of withstanding the environment in which it is employed. Therefore, any one or more materials for one or more components of the fluid transfer connector 40 are contemplated so long as the material is suitable for the application fluid transfer connector 40. Example materials include, but not limited to stainless steel, bronze, brass, copper, aluminum, steel, plastic, and combinations thereof.

The port fitting 22 and the hose 30 are configured to facilitate a protected transfer of fluid 26 from the fluid device 20 to another fluid device 20', to an inlet, and/or to an outlet. The port fitting 22 includes a male connector 24, such as a cylindrical tube, and a stop 26 that projects radially outwardly from a circumference of the male connector 24.

Figure 2:
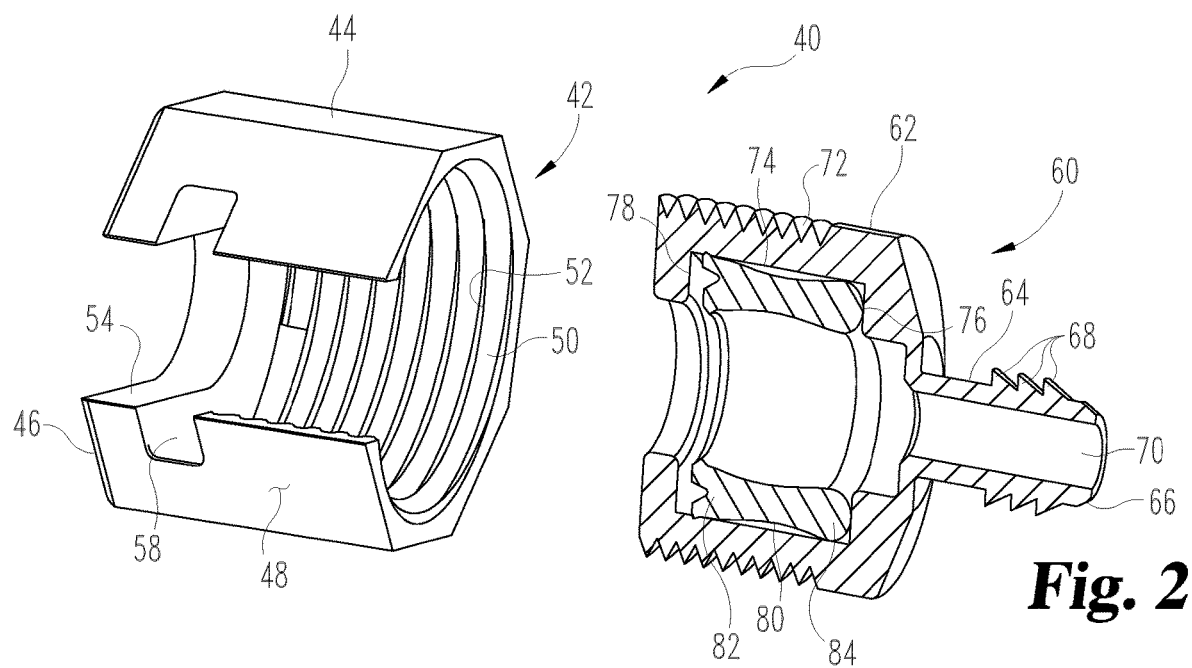
FIG. 2 is a perspective view in partial section of a fluid transfer connector according to the present disclosure.
Figure 3:
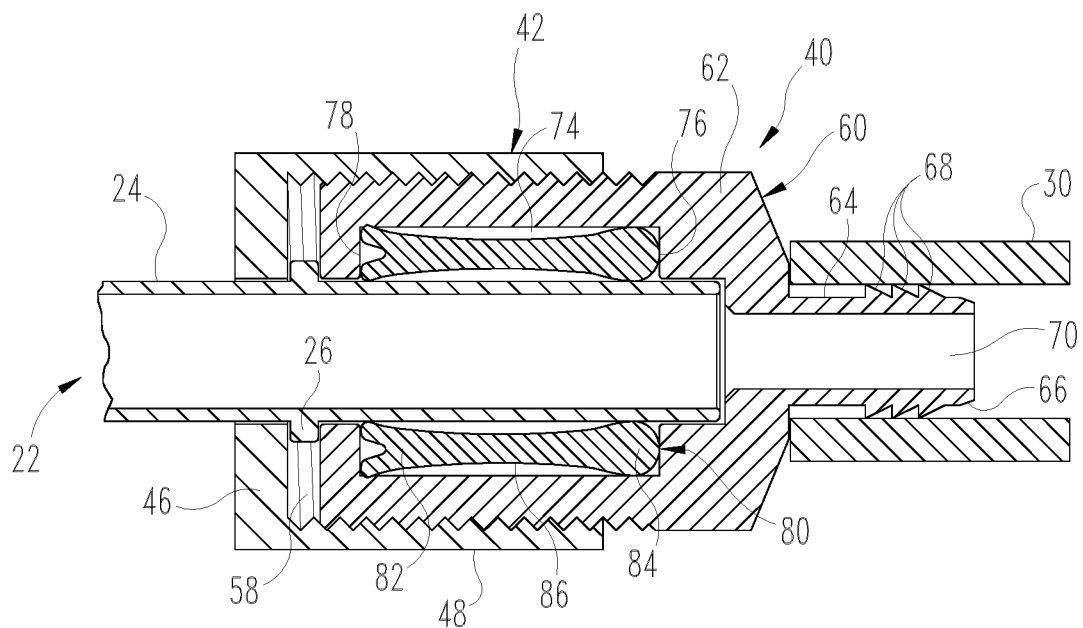
FIG. 3 is an elevation view in partial section of the fluid transfer connector of FIG. 2 mounted between a fluid device and a fluid hose.

With reference to FIG. 2, an embodiment of a fluid transfer connector 40 includes an attachment member 42 and a hose adapter 60. Attachment member 42 includes a slotted nut configuration, providing a first internally threaded ring formed by nut-shaped body 44 including an end wall 46, a side wall 48 extending around a cavity 50, and internal threads 52 around cavity 50. A slotted opening 54 extends through end wall 46, and a channel 58 is formed in side wall 48. Opening 54 and channel 58 allow the attachment member 42 to be side-loaded onto the port fitting 22, with the male connector 24 extending through the slotted opening 54 and into cavity 50, and with stop 26 received in channel 58 and in abutting engagement with end wall 46, as shown in FIG. 3.

Hose adapter 60 includes a second, externally threaded ring formed by a housing 62. A hose interface member 64 extends axially from one end of housing 62 opposite the attachment member 42. In the illustrated embodiment, hose interface member 64 includes a cylindrical body 66 having an outer surface with engaging members 68, such as teeth or barbs, that secure the fluid conduit 30 on hose interface member 64. A conduit 70 extends through hose interface member 64 and housing 62.

Housing 62 includes external threads 72 that threadingly engage internal threads 52 of attachment member 42. Housing 62 also includes an internal inner circumferential groove 74 that receives a seal 80 therein. Groove 74 includes an axially extending wall 75 that extends between first and second internal end walls 76, 78, and seal 80 extends between and can contact internal end walls 76, 78.

Figure 4A:
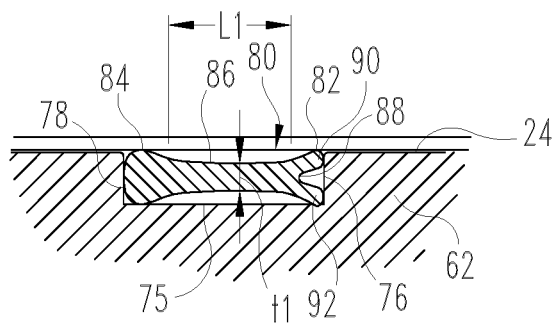
FIGS. 4A and 4B are cross-sectional partial views of embodiments of the wiper seal for the fluid transfer connector of FIG. 2.
Figure 4B:
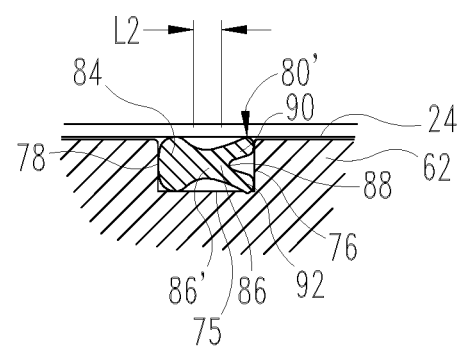

With reference to FIGS. 4A and 4B, various embodiments of seal 80 are contemplated. In each of the embodiments, seal 80 is a one piece seal with a first part and a second part connected to one another with a reduced thickness neck. In FIG. 4A, seal 80 includes a first part that is a wiper seal 82, a second part that is an O-ring seal 84, and an elongated neck 86 extending therebetween and connecting the first and second parts to form an integrated seal 80. Neck 86 includes a reduced thickness t1 in a radial direction relative a radial thickness of both wiper seal 82 and O-ring seal 84 that spaces neck 86 radially inwardly from the axial internal wall 75 of housing 62 and radially outwardly from the outer surface of male connector 24. In one embodiment, neck 86 includes an axial length L1 that is at least half of the overall length of the seal 80 between end walls 76, 78.

In FIG. 4B, seal 80' includes a first part that is a wiper seal 82, a second part that is an O-ring seal 84, like seal 80. Seal 80', however, includes a concave neck 86' extending between wiper seal 82 and O-ring seal 84 and connecting the first and second parts to form an integrated seal 80'. Neck 86' includes a reduced thickness formed by concave depressions on at least one, and as illustrated on both, of the inner and outer sides of the seal 80'. Neck 86' includes a reduced length L2 compared to neck 86.

In either embodiment, wiper seal 82 includes a concave depression 88 in the axial end wall thereof that forms an inner lobe 90 and an outer lobe 92. The inner lobe 90 flexes inwardly with the aid of depression 88 and the reduce thickness neck 86, 86' to contact the outer surface of male connector 24 to wipe residue therefrom as hose adapter 60 is axially slid along the male connector 24, while the outer lobe 92 engages the housing 62 to secure the seal 80, 80' in groove 74. O-ring seal 84 simultaneously sealingly engages the outer surface of the male connector 24.

As is evident from the figures and text presented above, a variety of aspects of the present invention are contemplated. According to one aspect, a fluid transfer connector an attachment member attachable to a port fitting of a fluid device and a hose adapter including a housing and a hose interface member attachable to a fluid hose. The housing includes a seal located in an inner groove of the housing that is coaxially aligned with a conduit through the hose adapter that is configured to receive the port fitting. The housing is slidable over the port fitting and connectable to the attachment member on the port fitting. The seal includes a first part that is configured to sealing engage an outer surface of the port fitting in the conduit of the hose adapter and a second part that is spaced axially from and sealingly engages an outer surface of the port fitting in the conduit of the hose adapter.

In one embodiment, the hose adapter is configured to be positioned within and interlock with the fluid hose. In one embodiment, the fluid device is one of a tank, a pump, and a doser.

In one embodiment, the attachment member includes an end wall with a slotted opening configured so the attachment member can be laterally positioned over the port fitting with a stop of the port fitting located within the attachment member, and the stop is clampingly engaged between the end wall and the housing of the hosing adapter.

In one embodiment, the attachment member includes a first threaded ring, and the housing of the hose adapter includes a second threaded ring threadingly engaged to the first threaded ring.

In one embodiment, the first part of the seal includes a wiper seal configuration that is configured to wipe residue on the port fitting as the housing is slid over the port fitting and the second part of the seal includes an O-ring configuration. In one embodiment, the first part and the second part of the seal are connected to one another with a connecting neck. In one embodiment, the connecting neck extends from the first part to the second part and is a formed by at least one radial concave depression on the seal. In one embodiment, the neck is formed by concave depressions on each of the inner and outer sides of the seal.

In one embodiment, the connecting neck is formed by an elongated, third part of the seal having a first thickness, and the first thickness is less than a thickness of each of the first and second parts. In one embodiment, the connecting neck has an axial length that is at least half of an overall axial length of the seal. In one embodiment, the connecting neck is spaced radially inwardly from an inner surface of the housing that defines the groove and the connecting neck is spaced radially outwardly from the outer surface of the port fitting.

In one embodiment, the wiper seal configuration includes a concave end wall that separates an inner lobe and an outer lobe at an axial end of the first part of the seal. The inner lobe can flex inwardly relative to the outer lobe and into the conduit for wiping of the outer surface of the port fitting as the housing is slid over the port fitting.

In one embodiment, the hose adapter is compatible with fluids including coolants, refrigerants, oils, fuels, and vapors. In one embodiment, the attachment member and the hose adapter are comprised of material selected from the group of materials consisting of: stainless steel, brass, bronze, copper, aluminum, steel, and plastic.

According to another aspect, a fluid transfer connector includes an attachment member attachable to a port fitting of a fluid device and a hose adapter including a housing and a hose interface member attachable to a fluid hose. The hose adapter includes a conduit extending through the housing and the hose interface member, and the housing includes an inner groove extending circumferentially around the conduit. A seal is located in the inner groove of the housing. The seal includes a first part that is configured to wipe residue from the port fitting as the housing is slid over the port fitting for attachment to the attachment member on the port fitting and a second part that sealingly engages an outer surface of the port fitting.

In one embodiment, the first part and the second part of the seal are connected to one another with a connecting neck, and the connecting neck is a formed by a radial concave depression on at least one of an inner side and an outer side of the seal.

In one embodiment, the first part and the second part of the seal are connected to one another with a connecting neck, and the connecting neck is a formed by an elongated, third part of the seal having a first thickness in a radial direction, and the first thickness is less than a radial thickness of each of the first and second parts.

In one embodiment, the connecting neck has an axial length that is at least half of an overall axial length of the seal. In one embodiment, the connecting neck is spaced radially inwardly from an inner surface of the housing that defines the groove and the connecting neck is spaced radially outwardly from the outer surface of the port fitting.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention.

Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fluid transfer connector, comprising:
   an attachment member attachable to a port fitting of a fluid device; and
   a hose adapter including a housing and a hose interface member attachable to a fluid hose, wherein the housing includes a seal located in an inner groove of the housing that is coaxially aligned with a conduit through the hose adapter that is configured to receive the port fitting, wherein the housing is slidable over the port fitting and connectable to the attachment member on the port fitting, and further wherein the seal includes a first part that is a wiper seal including a lobe inwardly flexed toward the port fitting to wipe reside on the port fitting as the housing is slid over the port fitting to sealingly engage an outer surface of the port fitting in the conduit of the hose adapter and a second part that includes an O-ring configuration, the second part being spaced axially from the first part to simultaneously sealingly engage the outer surface of the port fitting in the conduit of the hose adapter, wherein:
   the first part and the second part of the seal are connected to one another with a connecting neck;
   the connecting neck is a formed by an elongated, third part of the seal having a first thickness, wherein the first thickness is less than a thickness of each of the first and second parts; and
   the connecting neck is spaced radially inwardly from an inner surface of the housing that defines the groove and the connecting neck is spaced radially outwardly from the outer surface of the port fitting.

2. The fluid transfer connector of claim 1, wherein the hose adapter is configured to be positioned within and interlock with the fluid hose.

3. The fluid transfer connector of claim 1, wherein the fluid device is one of a tank, a pump, and a doser.

4. The fluid transfer connector of claim 1, wherein the attachment member includes an end wall with a slotted opening configured so the attachment member can be laterally positioned over the port fitting with a stop of the port fitting located within the attachment member, wherein the stop is clampingly engaged between the end wall and the housing of the hosing adapter.

5. The fluid transfer connector of claim 1, wherein the attachment member includes a first threaded ring, and the housing of the hose adapter includes a second threaded ring threadingly engaged to the first threaded ring.

6. The fluid transfer connector of claim 1, wherein the connecting neck extends from the first part to the second part and is a formed by at least one radial concave depression on the seal.

7. The fluid transfer connector of claim 1, wherein the connecting neck has an axial length that is at least half of an overall axial length of the seal.

8. The fluid transfer connector of claim 1, wherein the lobe is an inner lobe and the wiper seal configuration includes a concave end wall that separates the inner lobe and an outer lobe at an axial end of the first part of the seal that are positioned in contact with an internal end wall of the inner groove, wherein the inner lobe is flexed inwardly relative to the outer lobe and into the conduit and wipes the outer surface of the port fitting as the housing is slid over the port fitting, and wherein the O-ring configuration of the second part of the seal is in contact with an opposite internal end wall of the inner groove.

9. The fluid transfer connector of claim 1, wherein the hose adapter is compatible with fluids including coolants, refrigerants, oils, fuels, and vapors.

10. The fluid transfer connector of claim 1, wherein the attachment member and the hose adapter are comprised of material selected from the group of materials consisting of: stainless steel, brass, bronze, copper, aluminum, steel, and plastic.

11. A fluid transfer connector, comprising:
   an attachment member attachable to a port fitting of a fluid device; and
   a hose adapter including a housing and a hose interface member attachable to a fluid hose, wherein the housing includes a seal located in an inner groove of the housing that is coaxially aligned with a conduit through the hose adapter that is configured to receive the port fitting, wherein the housing is slidable over the port fitting and connectable to the attachment member on the port fitting, and further wherein the seal includes a first part that is a wiper seal including a lobe inwardly flexed toward the port fitting to wipe reside on the port fitting as the housing is slid over the port fitting and sealingly engage an outer surface of the port fitting in the conduit of the hose adapter and a second part that includes an O-ring configuration, the second part being spaced axially from the first part to simultaneously sealingly engage the outer surface of the port fitting in the conduit of the hose adapter, wherein:
   the first part and the second part of the seal are connected to one another with a connecting neck; and
   the connecting neck is formed by concave depressions on the inner and outer sides of the seal that extend axially between and connect the first part of the seal to the second part of the seal and are concavely curved in the axial direction from the first part of the seal to the second part of the seal to form a reduced thickness relative to the first part and the second part so that the inner side of the seal along the connecting neck is spaced radially outwardly from the outer surface of the port fitting and the outer side of the seal along the connecting neck from the first part to the second part is spaced radially inwardly from an axially extending internal wall of the inner groove of the housing.

12. A fluid transfer connector, comprising:
   an attachment member attachable to a port fitting of a fluid device;
   a hose adapter including a housing and a hose interface member attachable to a fluid hose, the hose adapter including a conduit extending through the housing and the hose interface member, wherein the housing includes an inner groove extending circumferentially around the conduit; and
   a seal located in the inner groove of the housing, wherein the seal includes a first part that is a wiper seal including a lobe inwardly flexed toward port fitting to wipe residue from the port fitting as the housing is slid over the port fitting for attachment to the attachment member on the port fitting, wherein the first part of the seal sealingly engages an outer surface of the port fitting and the seal includes a second part that simultaneously sealingly engages the outer surface of the port fitting, wherein:
   the first part and the second part of the seal are connected to one another with a connecting neck, and the connecting neck is a formed by an elongated, third part of the seal with opposite axially extending inner and outer sides that are concavely curved in the axial direction from the first part to the second part to form a first thickness in a radial direction, wherein the first thickness is less than a radial thickness of each of the first and second parts; and the connecting neck is formed by concave depressions on the inner and outer sides of the seal so that the outer side of the seal from the first part to the second part is spaced radially inwardly from an internal wall of the housing that defines the groove and the inner side of the seal along the connecting neck is spaced radially outwardly from the outer surface of the port fitting.

13. The fluid transfer connector of claim 12, wherein the lobe is an inner lobe and the first part of the seal includes a concave end wall that separates the inner lobe and an outer lobe at an axial end of the seal that are positioned in contact with an internal end wall of the inner groove of the housing, wherein the inner lobe is flexed inwardly relative to the outer lobe and into the conduit and wipes the outer surface of the port fitting as the housing is slid over the port fitting, and wherein the second part of the seal is in contact with an opposite internal end wall of the inner groove.

14. The fluid transfer connector of claim 12, wherein the connecting neck has an axial length that is at least half of an overall axial length of the seal.

* * * * *